Aug. 3, 1965     I. E. GOSLING     3,198,071
REAR-VIEW MIRROR HOUSING HAVING AN ADJUSTABLE SHIELD
Filed July 2, 1962

INVENTOR.
Ira E. Gosling
BY
Paul J. Leising
ATTORNEY

United States Patent Office 3,198,071
Patented Aug. 3, 1965

3,198,071
REAR-VIEW MIRROR HOUSING HAVING AN ADJUSTABLE SHIELD
Ira E. Gosling, Birmingham, Mich., assignor to General Motors Corporation, Detroit, Mich., a corporation of Delaware
Filed July 2, 1962, Ser. No. 206,578
4 Claims. (Cl. 88—98)

This invention relates to a rear-view mirror housing of the enclosed type which can be positioned on either side of a vehicle while giving the vehicle operator a clear view of the entire reflecting surface of the mirror.

Rear-view mirrors of the type positioned of the vehicle are frequenly subjected to accidental encounter, usually resulting in no more than causing the mirror to move out of adjustment. However, a problem does arise in the case of cable or otherwise operated remotely controlled mirrors which depend upon appropriate mechanism connected with the mirror for a selective adjustment thereof. A forceful blow of any appreciable magnitude against this type of mirror can either permanently damage the adjusting mechanism or sufficiently distort it so that for all practical purposes its usefulness is greatly impaired.

To avoid the above problem, it has been proposed to enclose the mirror with a suitable shield or bezel which terminates a distance beyond the mirror outer surface to allow for an angular positioning of the mirror without exposing any part thereof. The terminal edge of the shield has been so inclined that it gives the greatest amount of mirror surface visibility to the vehicle operator with a minimum amount of visual obstruction from the shield. The present practice has been to make a separate mirror housing with an appropriate shield for each side of the vehicle thereby necessitating separate mirror housings designated for the left or right side only of the vehicle being stocked and manufactured.

Accordingly, one object of this invention is to provide an adjustable shield on a remotely controlled mirror housing so that the same housing can be mounted on either side of the vehicle.

Another object of this invention is to provide a housing for a cable-operated remotely controlled mirror that includes means which serve to support the operating cables and also lock an adjustable shield in a position that gives the vehicle operator full vision of the mirror when the housing is mounted on either side of the vehicle.

The above objects and others are accomplished by a mirror housing having a bracket one end of which is connectable to a support while the other end terminates with an open end. Appropriate operating mechanism, which is connected at one end to a remotely located actuator, is located in the bracket and serves to support a mirror in a visual position as determined by movement of the actuator. A shield having an edge that lies in an inclined plane is supported by the open end of the housing and is adapted to substantially enclose the mirror and operating mechanism and thereby prevent any movement or damage to either. Means are provided with the bracket and shield for permitting adjustable movement of the latter to dispose the inclined edge for substantially full unobstructed vision of the entire mirror reflecting surface by the vehicle operator from either side of the vehicle.

A more complete understanding of the subject invention can be derived from the following description taken in conjunction with the accompanying drawings in which.

Figure 1:
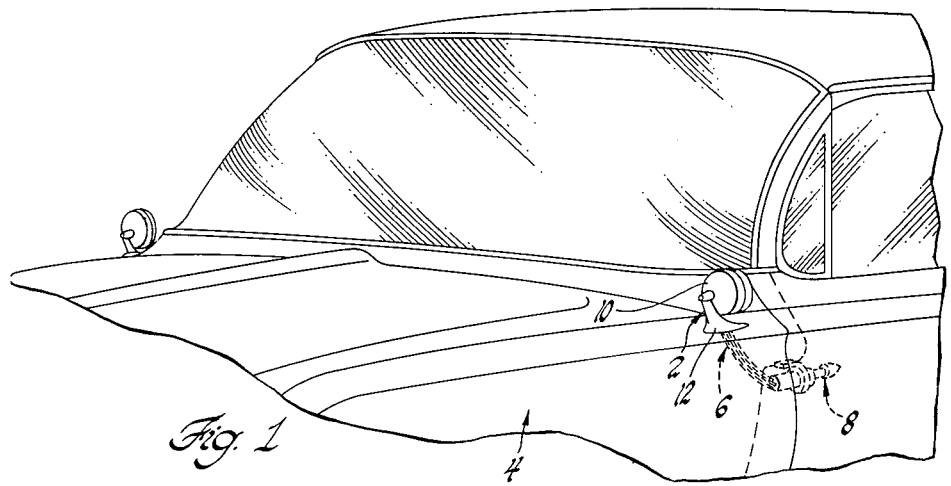
FIGURE 1 is a view showing a mirror incorporating the subject invention and mounted exteriorly of a vehicle.

Referring now to the drawing and particularly FIGURE 1, a mirror housing 2 incorporating the subject invention is shown fixed to a vehicle fender 4 and includes a plurality of flexible cables 6 composed of the usual wire and sheath portions. Each of the cables 6 are connected at one end thereof to the mirror housing 2 and at the other end to a remotely located actuator 8 which is disposed interiorly of the vehicle on the instrument panel or any other position which may be conveniently accessible to the vehicle operator for manual operation.

Figure 2:
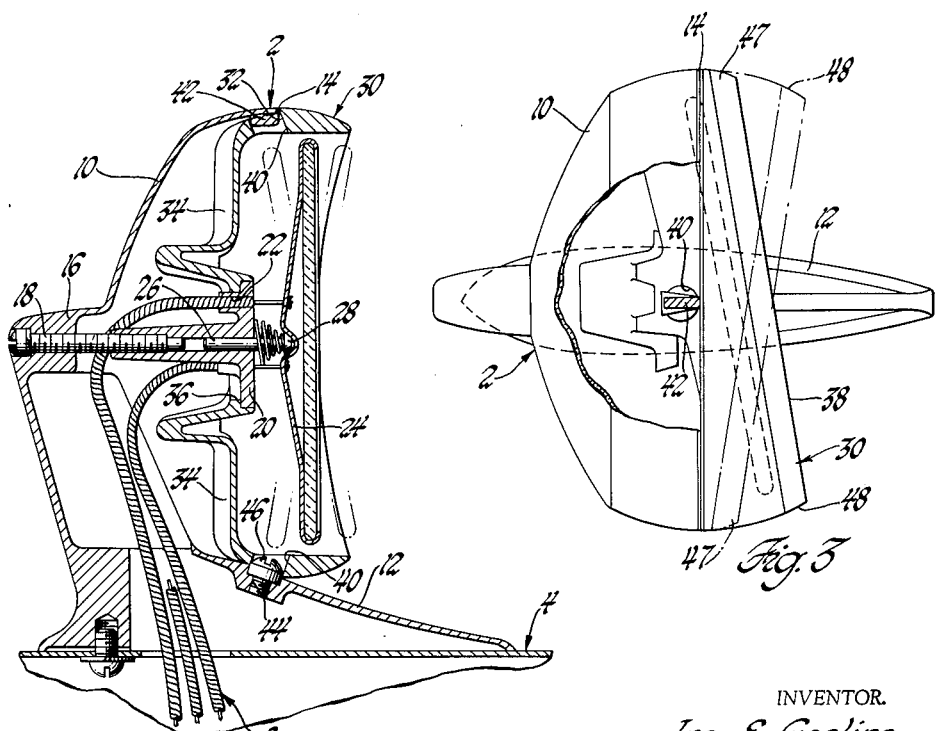
FIGURE 2 is an enlarged view of the mirror shown in FIGURE 1 taken on a vertical section.
Figure 3:
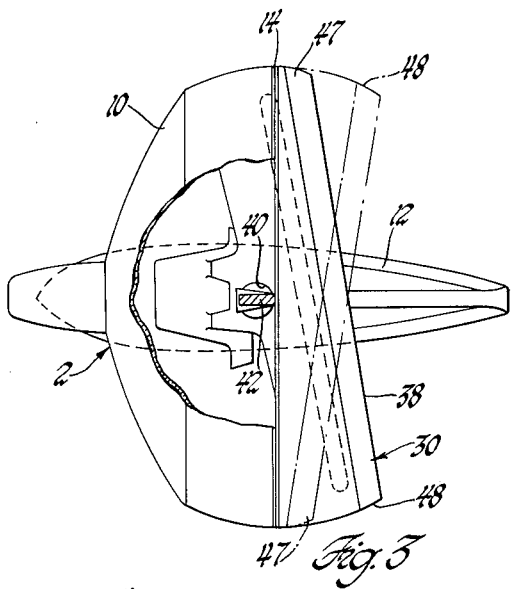
FIGURE 3 is an elevation view of the mirror shown in FIGURE 2 with portions broken away.

As best seen in FIGURES 2 and 3, the mirror housing 2 comprises a bracket 10 having an elongated narrow mounting portion 12 that is secured to a support such as the sheet metal of the fender 4. The bracket 10 terminates at the upper end thereof with an annular edge 14 and includes a boss 16 centrally disposed with respect to the edge 14 with a bore therein for accommodating a screw 18 which at one end threadably supports a cable support 20. Although not evident from the drawing, the cable support 20 is located centrally with respect to the annular edge 14 of the mirror bracket 10 and, in addition, includes three axially extending bores 22 spaced in triangular form for separately accommodating the sheath ends of the cables 6 whose wires are connected to a mirror support 24. A spring bias pin 26 is slidably supported by the cable support 20 and includes a semispherical head 28 engageable with a complementary surface formed in a mirror support 24. The spring bias pin 26 continuously urges the mirror support 24 in an outward direction so as to tension the cables 6 and permit the mirror to maintain an adjusted position when moved by any of the cables.

A shield in the form of a bezel, generally indicated by the numeral 30, includes an annular mounting surface 32 that is of a reduced diameter so as to be insertable beyond the edge 14 of the mirror bracket and placed in mating engagement with the inner annular peripheral surface of the mirror bracket. The mounting surface 32 leads to a radially inwardly extending webbing 34 which terminates with a counterbored opening 36 for mating engagement with the peripheral edge of the cable support 20. As best seen in FIGURE 3, it should be noted that the shield 30 terminates with an inclined edge 38 which lies in a plane perpendicular to the mounting surface to which the lower portion 12 of the mirror bracket 10 is connected. It will be noted further that the edge 38 lies in a plane that is inclined to and intersects a vertical plane passing through the edge 14 of the bracket 10. Additionally, a pair of bores 40 are formed on inclined axes in the shield 30 at points diametrically opposite to each other. The bores serve to locate the shield relative to the bracket by having one of the bores accommodate a guide stub 42 which is rigid with the bracket 10 while the other bore is placed in alignment with a threaded bore 44 formed in the mounting portion 12 of the mirror bracket. A cap screw 46 is threaded into bore 44 while the screw 18 threaded into the cable support 20 draws and seats the latter firmly in the counterbore 36 and thereby locks the shield to the bracket so as to preclude any rattling between the members.

With the various components of the mirror housing positioned as shown in FIGURE 2, the inclined edge 38 of the shield is disposed as shown in full lines in FIGURE 3 to give the vehicle operator an unobstructed view of the mirror when the mirror housing 2 is mounted onto the left front fender of the vehicle. It should be noted that with the shield so positioned, a pair of exposed surfaces 47, 48 of minimum and maximum area, respectively, are disposed at diametrically opposed points of the shield on a horizontal axis. As seen in FIGURE 3, the respective surfaces are located at opposite sides of the longitudinal axis of mounting portion 12.

Where the above described mirror housing is to be mounted on the right front fender of the vehicle, it should be apparent that should the shield remain in the full-line position of FIGURE 3, adjustment of the mirror support 24 for a desired rearward view would cause a portion of the latter to be exposed beyond the surface 47 of the shield with the opposite surface 48 obstructing full view of the mirror reflecting surface. With this invention, however, the same housing can be used and by a simple loosening of the screw 18 to release the cable support 20 from shield engagement and removal of the screw 46, the shield 28 can be tilted out of engagement with the stub 42. The shield is then rotated 180 degrees so as to locate the surfaces 47 and 48 on sides directly opposite to that originally assumed and thereby have the inclined edge 38 automatically take the position shown by phantom lines in FIGURE 3. Thereafter, it is just a matter of once again placing the shield bores 40 in respective alignment with the stub 42 and bore 44 and tightening the screws 18 and 46 to complete the assembly of the mirror housing with the adjusted shield.

From the above, it should be apparent that this invention provides a mirror housing terminating with an extending inclined edge in the form of a shield that may be adjusted to present substantially full unobstructed view of the mirror surface irrespective of the location of the mirror. Moreover, the means for adjusting the position of the shield, namely the screws 18 and 46, are readily accessible whether the mirror housing has been mounted to the vehicle or not. Thus, where the mirror housing is secured to the vehicle fender or door prior to adjusting the shield for maximum visibility of the mirror, subsequent shield adjustment can be made without necessitating a removal of the entire housing.

Various changes and modifications can be made in the subject construction without departing from the spirit of the invention. It should be understood that such changes and modifications are contemplated by the inventor and he does not wish to be limited except by the scope of the appended claims.

In the claims:

1. A mirror housing for a rear view mirror mountable on either side of a vehicle, comprising a bracket member having a mounting portion and an open end terminating with an edge lying in a vertical plane, a shield member having an inner mounting surface engaging said edge, a mirror support encompassed by said shield member, said shield member having an outer edge lying in a plane inclined to said vertical plane so as to present a large exposed surface and a small exposed surface respectively located at diametrically opposed points of the shield member, cooperating means formed on said bracket member and said shield member to permit the small exposed surface to be adjustably located on opposite sides of a vertical center line passing through the mirror support by rotating the shield member about an axis substantially normal to said vertical plane, said cooperating means comprising a stub formed on one of said members and a pair of openings provided in the other of said members.

2. The mirror housing of claim 1 wherein said openings are located at diametrically opposed points.

3. A remotely controlled outside rear view mirror mechanism for a vehicle, comprising a housing including a bracket having an open end terminating with an edge lying in a vertical plane, a bezel having an inner end carried by the open end of the bracket and including a radially extending webbing having a seating portion formed therein, said bezel terminating with an outer edge lying in a plane inclined to said vertical plane so as to define a large exposed surface and a small exposed surface respectively located at diametrically opposed points of the bezel, a mirror support encompassed by said bezel, a remotely located actuator, a plurality of cables connecting the actuator to the mirror support, a support for said cables seated in said seating portion of the bezel, said cable support including means for universally carrying the mirror support, means carried by the bracket and connected to the cable support for locking the bezel to the bracket, a guide stub formed on the bracket, and means formed in said bezel for cooperation with the guide stub to permit the small exposed surface of the bezel to be adjustably located on opposite sides of a vertical center line passing through the mirror support by rotating said bezel about an axis substantially normal to said vertical plane so that said housing is mountable on either side of the vehicle.

4. A remotely controlled outside rear view mirror mechanism for a vehicle, comprising a housing including a bracket having a circular open end terminating with an edge lying in a vertical plane, an annular bezel having an inner end formed as a mounting surface for cooperating engagement with the open end of the bracket and including an integral radially extending webbing having a seating portion formed therein, said bezel terminating with an outer edge lying in a plane inclined to said vertical plane so as to define a large and small exposed surface respectively located at diametrically opposed points of the bezel, a mirror support encompassed by said bezel, a remotely located actuator, a plurality of cables connecting the actuator to the mirror support, a support for said cables seated in said seating portion of the bezel, said cable support including means for universally carrying the mirror support, screw means carried by the bracket and connected to the cable support for locking the mounting surface of the bezel to the bracket, a guide stub formed on the bracket, and means formed in said bezel for cooperation with the guide stub to permit the small exposed surface of the bezel to be located on opposite sides of a vertical center line passing through the mirror support by rotating said bezel about an axis substantially normal to said vertical plane so that said housing is mountable on either side of the vehicle.

References Cited by the Examiner

UNITED STATES PATENTS

| | | | |
|---|---|---|---|
| 2,855,825 | 10/58 | Feder | 88—98 X |
| 3,046,841 | 7/62 | Kawecki | 88—98 |

JEWELL H. PEDERSEN, *Primary Examiner.*